(12) United States Patent
Conner et al.

(10) Patent No.: US 12,546,758 B2
(45) Date of Patent: Feb. 10, 2026

(54) ELECTRIC VEHICLE FLUID TEST SYSTEM

(71) Applicant: Southwest Research Institute, San Antonio, TX (US)

(72) Inventors: Joshua C. Conner, San Antonio, TX (US); Nolan A. Erickson, San Antonio, TX (US); J. Matthew Jackson, San Antonio, TX (US); Terrence F. Alger, II, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 289 days.

(21) Appl. No.: 18/205,846

(22) Filed: Jun. 5, 2023

(65) Prior Publication Data

US 2024/0402146 A1    Dec. 5, 2024

(51) Int. Cl.
*G01N 33/28* (2006.01)
*G01N 27/416* (2006.01)
*G01N 33/00* (2006.01)

(52) U.S. Cl.
CPC ....... *G01N 33/2805* (2013.01); *G01N 27/416* (2013.01); *G01N 33/2888* (2013.01); *G01N 33/0083* (2024.05)

(58) Field of Classification Search
CPC ............. G01N 33/2805; G01N 27/416; G01N 33/2888; G01N 33/0083
See application file for complete search history.

(56) References Cited

U.S. PATENT DOCUMENTS

| | | | | |
|---|---|---|---|---|
| 4,049,525 A | * | 9/1977 | Dutton | G01N 17/02 204/404 |
| 5,604,441 A | * | 2/1997 | Freese, V | G01N 33/2888 324/663 |
| 5,889,200 A | * | 3/1999 | Centers | G01N 27/06 73/53.07 |
| 8,842,283 B2 | * | 9/2014 | Janssen | G01N 21/85 356/438 |
| 9,488,612 B2 | * | 11/2016 | Watts | G01N 27/06 |
| 11,262,298 B2 | * | 3/2022 | Hodel | G01N 21/3577 |

(Continued)

FOREIGN PATENT DOCUMENTS

| | | | |
|---|---|---|---|
| CN | 102628819 A | * | 8/2012 |
| CN | 116148448 A | * | 5/2023 |

(Continued)

OTHER PUBLICATIONS

CN-116148448-A (Year: 2023).*

(Continued)

*Primary Examiner* — Ryan D Walsh
(74) *Attorney, Agent, or Firm* — Patterson + Sheridan, LLP; William Ryann

(57) ABSTRACT

An electric vehicle test chamber device for electric vehicle fluid oxidation testing. The device is incorporated into a system that includes a shaft implement such as a pump as well as a variable electric input mechanism with capacity to impart a variety of different types of electrical fields to the fluid. The fields may be induced by direct current, alternating current or an electromagnetic current. The system includes an acquisition unit for collection of oxidation data as well as capacity to account for a variety of other parameters applied to the fluid in order to attained enhanced accuracy of oxidation data analysis.

16 Claims, 5 Drawing Sheets

(56) References Cited

U.S. PATENT DOCUMENTS

| | | | | |
|---|---|---|---|---|
| 2012/0255876 A1* | 10/2012 | Hermann | ........... | G01N 27/4168 |
| | | | | 205/789 |
| 2019/0025189 A1* | 1/2019 | Al-Janabi | .............. | G01N 17/02 |
| 2023/0288395 A1* | 9/2023 | Dhawan | ............. | G01N 33/2847 |

FOREIGN PATENT DOCUMENTS

| | | | | | |
|---|---|---|---|---|---|
| DE | 102017007212 A1 | * | 1/2018 | | |
| JP | 2015230313 A | * | 12/2015 | ............. | G01N 27/06 |
| WO | WO-2016093892 A1 | * | 6/2016 | ............. | F16C 19/52 |
| WO | WO-2017187770 A1 | * | 11/2017 | ........... | G01N 27/221 |
| WO | WO-2023033860 A1 | * | 3/2023 | ............. | G01N 17/04 |

OTHER PUBLICATIONS

DE-102017007212-A1 (Year: 2018).*
JP-2015230313-A (Year: 2015).*
WO-2016093892-A1 (Year: 2016).*
Test methods for evaluating electrified vehicle fluids; Lube-Tech; Jackson; Aug. 2022 (Year: 2022).*
The brave new world of electric vehicle fluids; ULTRUS; McGuire; Sep. 30, 2021 (Year: 2021).*
Electrical compatibility of transmission fluids in electric vehicles; Tribology International; Rodriguez et al.; 2022 (Year: 2022).*
CN-102628819-A, English Translation (Year: 2012).*
WO-2017187770-A1, English Translation (Year: 2017).*
WO-2023033860-A1, English Translation (Year: 2023).*

\* cited by examiner

ELECTRIC VEHICLE FLUID TEST SYSTEM

BACKGROUND

Materials and items used in a variety of different applications are often evaluated for different character traits prior to use. Samples of different material types may be subjected to tests and evaluations to determine chemical properties, robustness, and any number of different behaviors. With this is mind fluid lubricants are often subjected to such testing. A common standard is the Aluminum Beaker Oxidation Test (ABOT). This includes a heated test vessel or chamber to accommodate a given fluid type along with shaft that is coupled to a gear pump, metal catalysts submerged in the fluid, and air injection. In this way, the shaft-driven pump may be utilized to circulate or otherwise agitate the accommodated fluid in a manner resembling, for example, vehicle transmission behavior. The fluid may be monitored over time and under various conditions for behavior and performance, particularly in terms of oxidation as a primary indicator.

However, with the move to electric vehicles and an ever increasing market share, existing test methods may fail to account for the electrical field that is often present during use of such fluids. Drivetrain lubricants are generally subjected to the noted ABOT even where the lubricants are to be utilized in electric vehicles. However, this test and others have been developed in a manner that is not tailored to evaluation of oxidation performance of light and heavy-duty drivetrain fluids that are meant for use in electric vehicles.

At present, these types of fluids are evaluated in a manner that does not more fully reflect the environment in which electric vehicle fluids are utilized. Instead, operators are in the position of utilizing less informative tests in combination with a fair amount of trial and error. There are no tests tailored specifically to evaluate oxidation performance in the presence of electromagnetic fields which are prevalent in the majority of modern electric vehicle drivetrains.

SUMMARY

A test system for an electrical vehicle fluid. The system includes a grounded stationary chamber to accommodate a moving test component and a lubricant representing the fluid. A variable electrical input mechanism is also located within the chamber for application of multiple electrical conditions to the fluid. The conditions are any of a direct current source, an alternating current source and an electromagnetic state. An acquisition unit is also provided for acquiring and managing lubricant data in light of the applied conditions.

BRIEF DESCRIPTION OF THE DRAWINGS

Implementations of various structure and techniques will hereafter be described with reference to the accompanying drawings. It should be understood, however, that these drawings are illustrative and not meant to limit the scope of claimed embodiments.

DETAILED DESCRIPTION

Embodiments are described with reference to a particular test system for electric vehicle fluids. As used herein, the term fluid or fluids is meant to encompass vehicle lubricants such as transmission fluid. However, other types of fluids may also be tested with the system. Regardless, so long as the system includes a chamber or platform for agitating an accommodated fluid while also including a variable electric input mechanism for optional application of different electrical field types, appreciable benefit may be realized.

Figure 1:
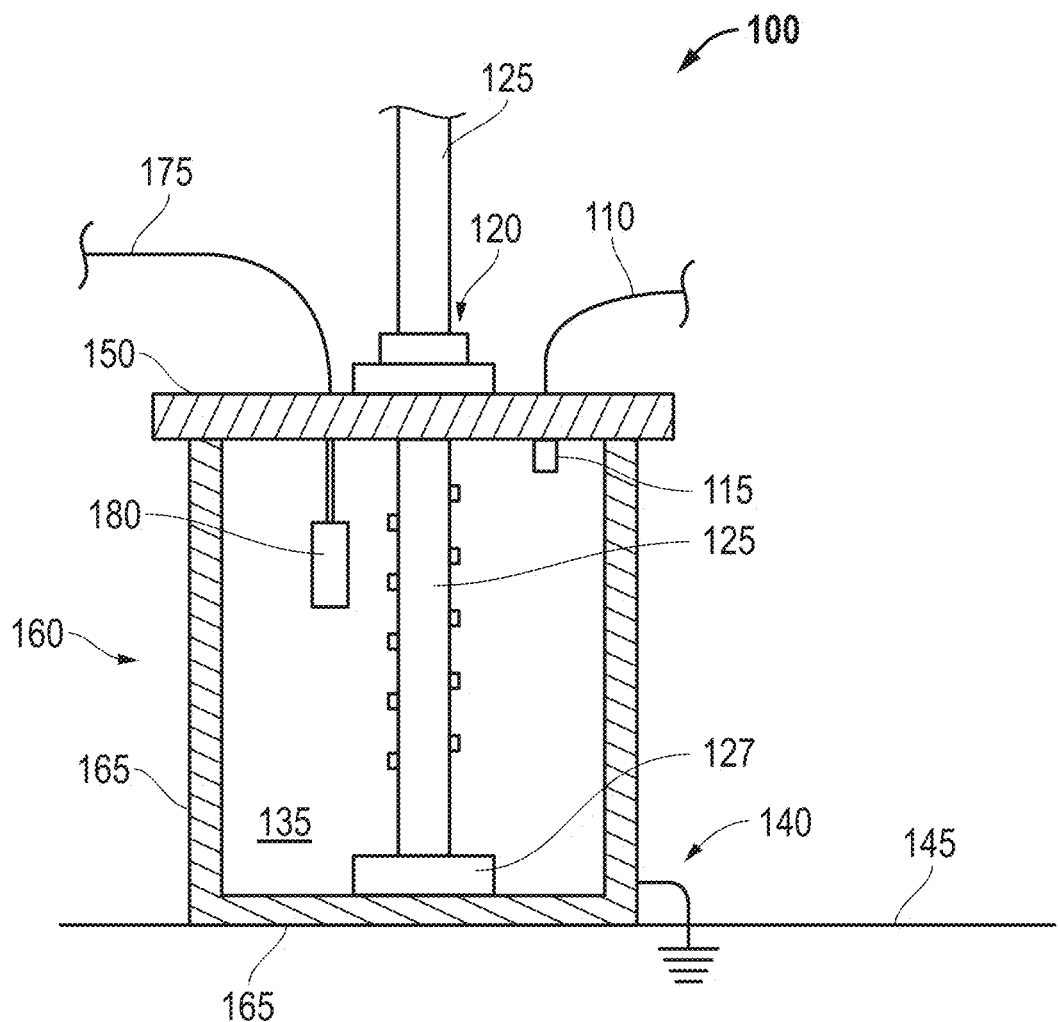
FIG. 1 is a side cross-sectional view of an embodiment of an electric vehicle fluid test chamber.

Referring now to FIG. 1, a side cross-sectional view of an embodiment of an electric vehicle fluid test chamber 100 is illustrated. For the embodiment shown, the test chamber 100 accommodates a fluid 135 which may be a conventional transmission fluid or a newer synthetic often perceived as more suited for use in an electric vehicle.

The chamber 100 accommodates an implement such as a shaft driven gear pump 127 that is used as an air injection element which may display shear and mixing capability as described further below. Note the shaft 125 traversing a head 120 of the chamber lid 150 where the where it is rotatably coupled and secured at the pump 127. A detector 115 is shown in the chamber 100 which is wired 110 to an acquisition unit which may include testing equipment for analysis such as the computer 480 illustrated in FIG. 4. The chamber body 160 also includes conventional sidewalls 165 and a base 165.

Figure 3C:
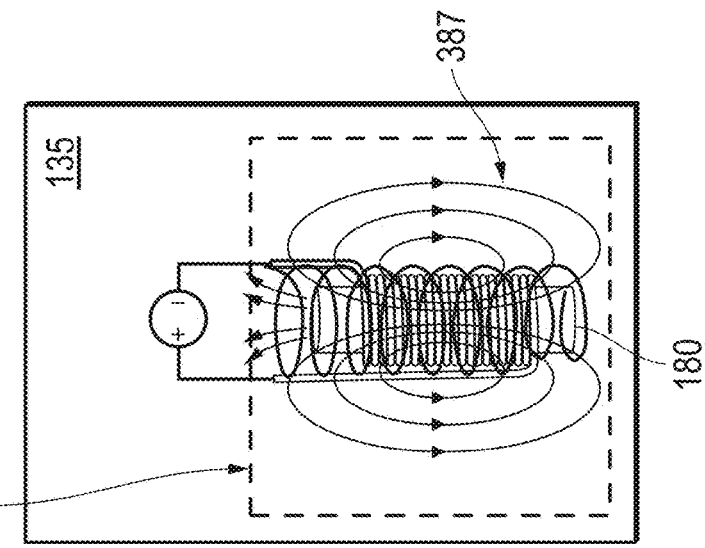
FIG. 3C is a schematic view of the test chamber of FIG. 1 during application of an electromagnetic field to the fluid.
Figure 3B:
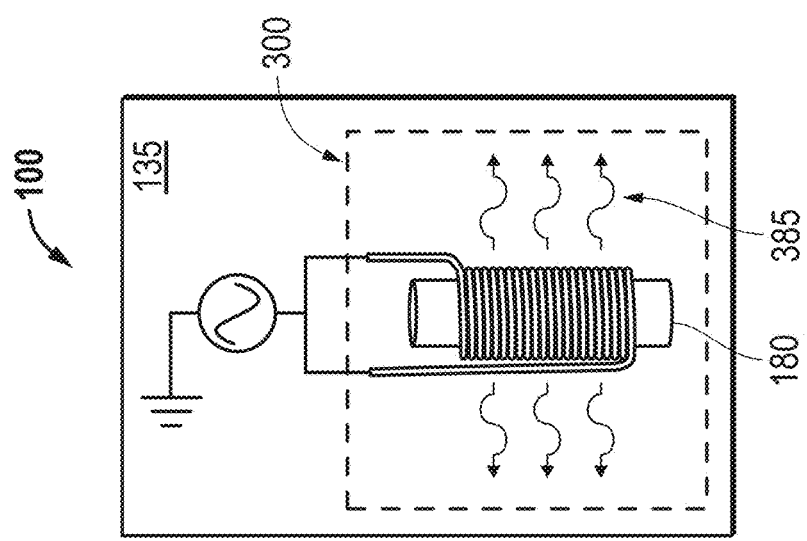
FIG. 3B is a schematic view of the test chamber of FIG. 1 during application of an alternating current source to the fluid.
Figure 3A:
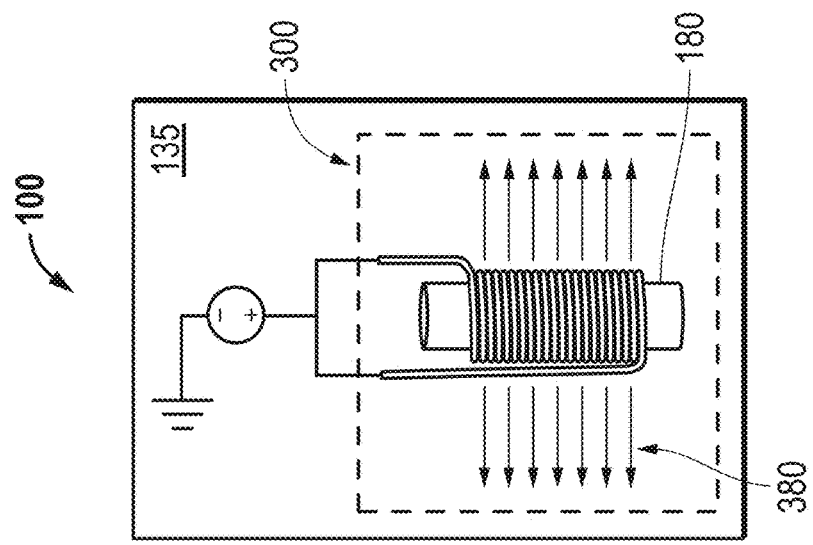
FIG. 3A is a schematic view of the test chamber of FIG. 1 during application of a direct current source to the fluid.

More notably, a variable electric input mechanism 180 is also provided that is utilized to induce a variety of different types of electric fields as shown in FIGS. 3A-3C. The mechanism 180 is shown separate from the pump shaft 125 for ease of illustration but may be incorporated into the pump shaft 125 for a more compact system embodiment. Regardless, the mechanism 180 is submerged in the fluid 135 to induce any of a direct current, an alternating current or an electromagnetic field, any of which are prone to be present in an electric vehicle drivetrain. As such, more detailed information is available in terms of factors leading to oxidation of the fluid 135.

Figure 2:
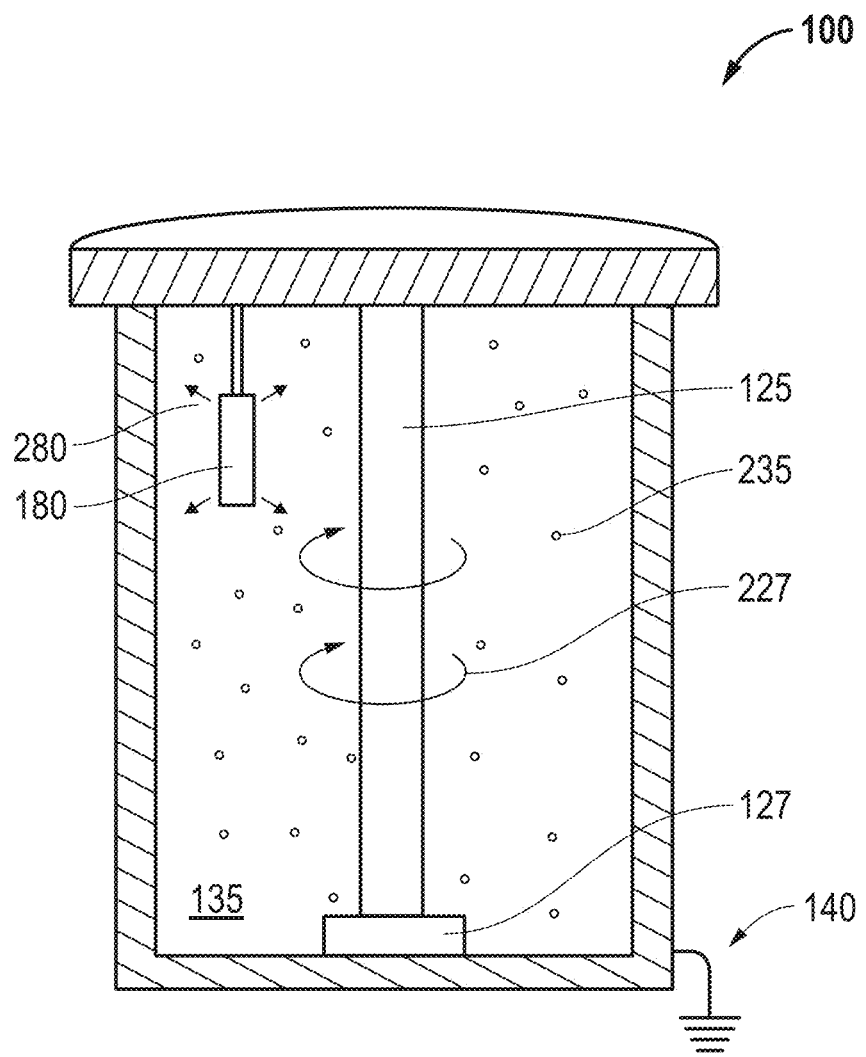
FIG. 2 is a side cross-sectional view of the electric vehicle fluid test chamber of FIG. 1 during testing.

Referring now to FIG. 2, a side cross-sectional view of the electric vehicle fluid test chamber 100 of FIG. 1 is illustrated during testing. Notice the circulation 227 of the fluid 135 that is induced by the pump shaft 125. Of course, the chamber 100 remains grounded 140 and now an electric field 280 is also induced by the variable electric input mechanism 180. Between the combined effects of the pump shaft 125 and the mechanism 180, a degree of oxidation may occur in the presence of air bubbles 235 and catalysts of the fluid 135 such as certain metals. This, in turn may adversely affect viscosity and overall fluid performance. Analysis of the fluid 135 may provide operators with information indicative of the degree of oxidation and allow for determinations of the effect of a given electrical field type 280 in addition to the pumping and other factors such as heat.

For the depicted embodiment of FIG. 2, both an electric field 280 is induced along with the air mixing and shearing 227. Of course, these factors may be considered individually, with only one being imparted on the fluid 135 at a time or they may be combined with another factor such as test duration, the noted application of heat or air injection rate. Further, the degree to which the fluid 135 is subjected to any of these factors may be quite variable. By way of example only, an electric vehicle fluid may be tested at a constant temperature of 155° C. for a predetermined period of time, fixed pump speed of 1,100 rpm, constant air injection rate of 5 ml per minute, and a variety of other factors or parameters as noted herein. Of course, operators may use any parameters within practical limits. However, given general health and safety regulations already in effect, such limits would not be of significant concern where electric vehicle fluids 135 are at issue for the embodiments described herein. Once more, when it comes to testing field types 280, a variety of additional electrical condition options are also now available as described here below.

Referring now to FIG. 3A, a schematic view of the test chamber 100 of FIG. 1 is shown during application of a direct current source 380 to the fluid 135 resulting in direct current induced electric field 300. The variable electric current mechanism 180 may include an insulated metallic wire. For the embodiments depicted, the mechanism 180 is separately supplied. However, the coil may be wound about the pump shaft 125 of FIG. 1 such that the mechanism 180 and moving test component are combined as a more compact part for the chamber 100. Notice that direct current voltage would now be an added parameter for consideration.

Referring now to FIG. 3B, a schematic view of the test chamber 100 of FIG. 1 is shown during application of an alternating current source 385 to the fluid 135 resulting in alternating current induced electric field 300. The variable electric current mechanism 180 may again include an insulated metallic wire which may be separately supplied or wound about the pump shaft 125 of FIG. 1 with foot space for the chamber 100 in mind. For this test, alternating current voltage, waveform and frequency are all additional parameters available for consideration.

Referring now to FIG. 3C, a schematic view of the test chamber 100 of FIG. 1 is shown during application of an electromagnet 387 to the fluid 135 resulting in an electromagnetic induced electric field 300. The variable electric current mechanism 180 may again include an insulated metallic wire which may be separately supplied or wound about the pump shaft 125 of FIG. 1. Further, with this embodiment, magnetic field strength is an added available testing parameter.

Figure 4:
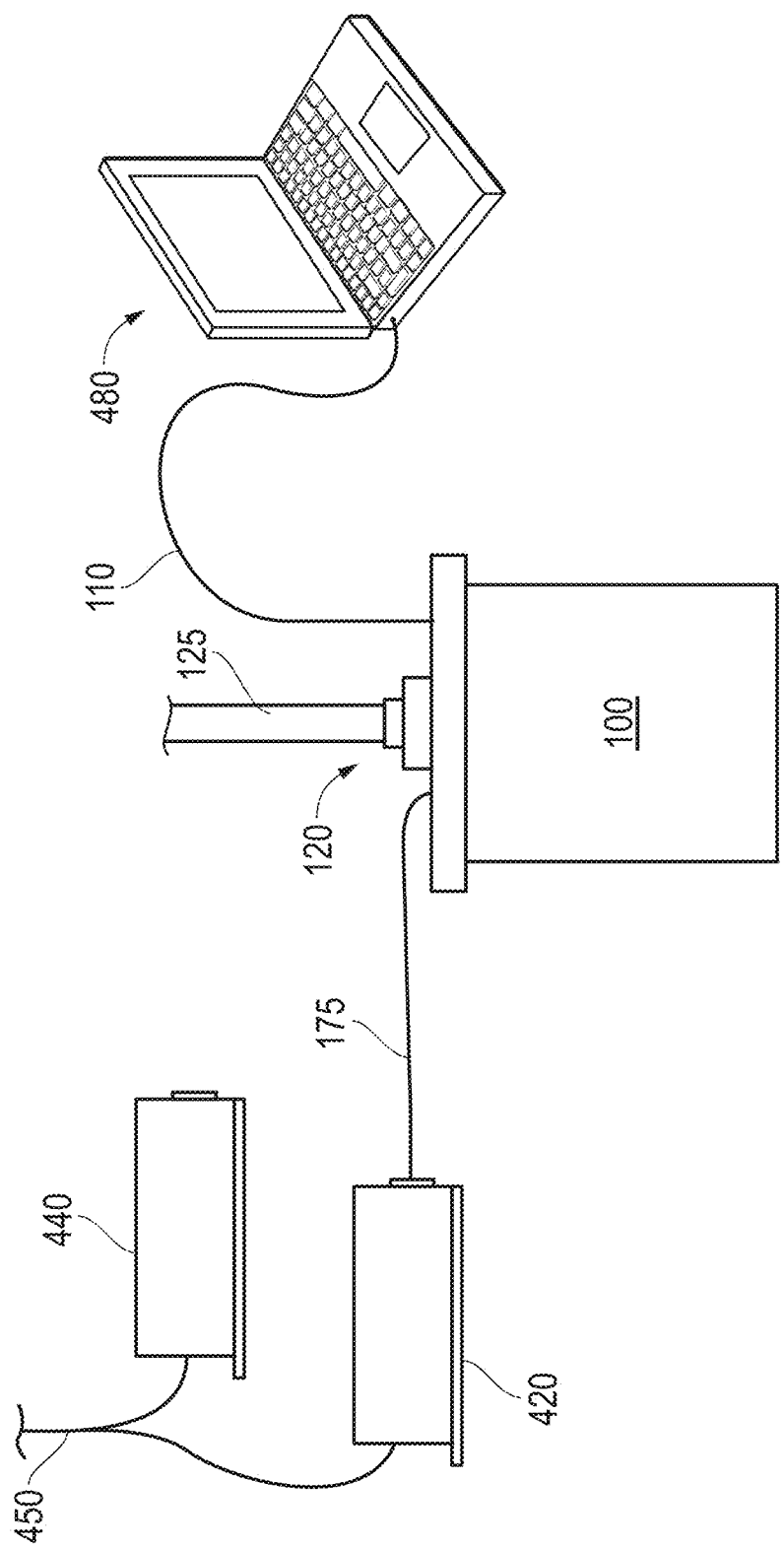
FIG. 4 is a schematic overview of an embodiment of an electric vehicle fluid test system employing the chamber of FIG. 1.

Referring now to FIG. 4, a schematic overview of an embodiment of an electric vehicle fluid test system is shown employing the chamber 100 of FIG. 1. For the embodiment shown, dedicated electric motors 420, 440 are shown to supply power to the variable electric current mechanism 180 and pump 127. Inputs 450 to direct the motors 420, 440 may be coupled to an operator set controller. In one embodiment, an operator may utilize a standard laptop 480 to direct the input through the motors 420, 440 in order to set speed and voltage parameters for a predetermined test. Of course, a single motor 420 embodiment may also be employed to apply the parameters to the chamber 100 for testing of the fluid 135.

Oxidation results may be attained from the detector 115 of FIG. 1 through conventional wiring 110. The resulting data may be analyzed through the depicted laptop 480 or other suitable central processing unit equipment. While the oxidation data may be fairly straight forward, analysis of the data may account for known parameters than include test duration, fluid temperature, pump speed, air injection rate, different types of voltage or magnetic field strength, and/or, in the case of alternating current, waveform and frequency. Once more, all of these parameters may be directed through the same test system without the requirement of separate dedicated chambers or electrical current input mechanisms (e.g. 180).

Figure 5:
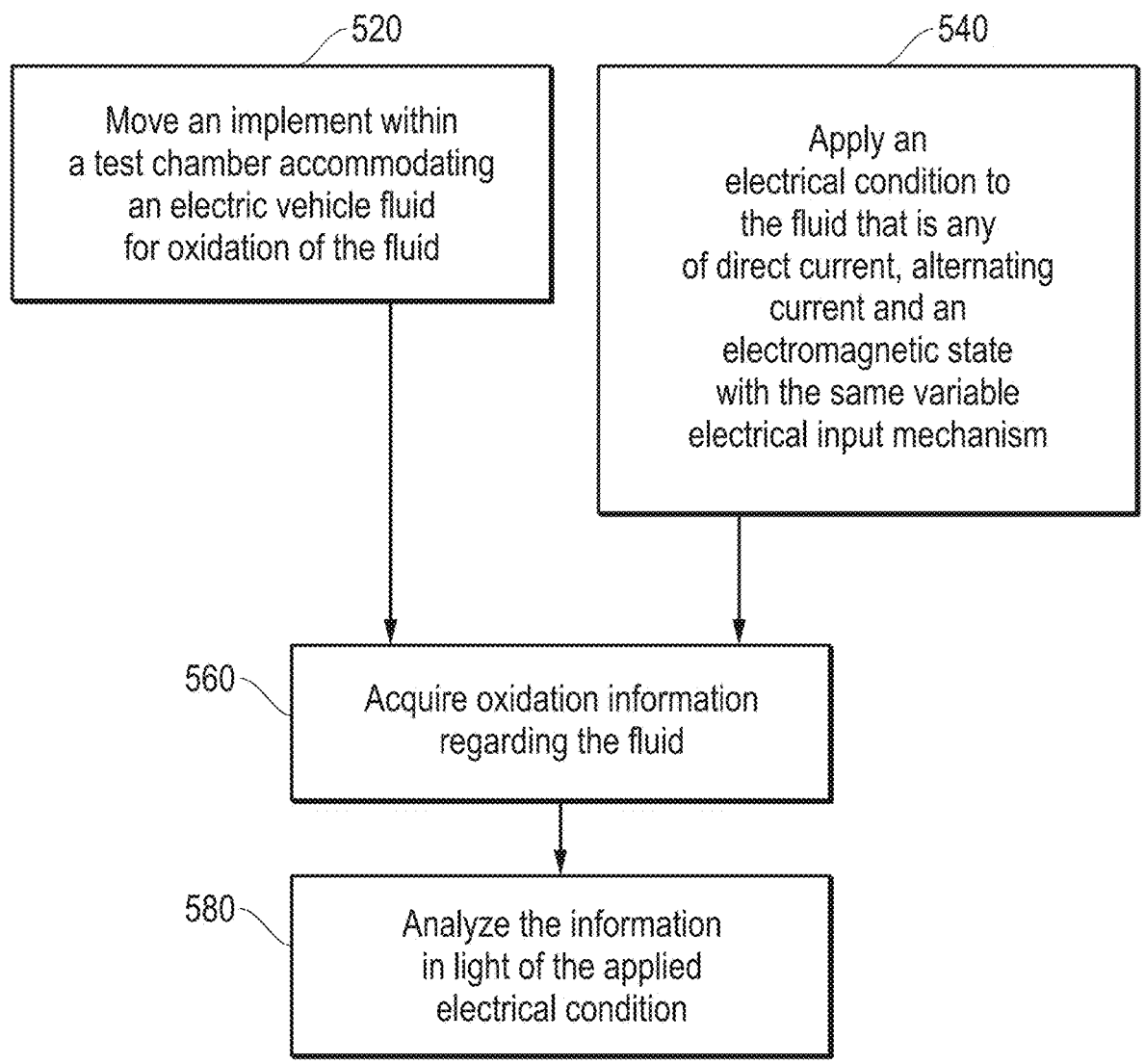
FIG. 5 is a flow-chart summarizing an embodiment of utilizing the system of FIG. 4 to attain and manage electric vehicle fluid data.

Referring now to FIG. 5, a flow-chart summarizing an embodiment of utilizing the system of FIG. 4 to attain and manage electric vehicle fluid data. As indicated at 520, an implement such as a pump is located within a test chamber to induce air mixing and shear on an electric vehicle fluid that is present in the chamber for testing. At the same time, an electrical condition is also applied to the fluid by a variable electrical input mechanism with the capacity to induce a variety of different types of electrical fields (see 540).

Of course, a variety of other factors such as test duration, heat, pump speed and others may be imparted on the fluid as detailed above. Thus, all of these factors may be considered as oxidation information is acquired as noted at 560. This means that the oxidation information may be analyzed in light of various factors that will include a host of different applied electrical conditions available through the same variable electrical input mechanism.

Embodiments described hereinabove include an oxidation test system for electric vehicle fluids. The system includes the use of a chamber outfitted with a variable electric input mechanism with the capacity to induce a variety of different types of electric fields. As a result, electric vehicle fluids may be evaluated in a manner that more fully reflects the environment in which electric vehicle fluids are to be utilized. Thus, operators may employ less trial and error evaluations in terms of different types of electric fields and the resulting impact on electric vehicle fluid oxidation and ultimately fluid performance.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. An electric vehicle test chamber device of a system for evaluating oxidation of an electric vehicle fluid, the device comprising: a chamber to accommodate the electric vehicle fluid and in communication with an acquisition unit for acquiring and managing fluid data; a pump shaft implement with oxidation catalyst submerged within the fluid; a variable electrical input mechanism submerged in the fluid for application of multiple different types of electrical fields to the fluid to generate the fluid data, the fields induced by any of a direct current source, an alternating current source and an electromagnet; wherein the variable electrical input mechanism comprises an insulated metallic wire; and the insulated metallic wire comprises a coil wrapped about the pump shaft implement.

2. The electric vehicle test chamber device of claim 1 wherein the pump shaft implement is coupled to a shaft driven gear pump.

3. The electric vehicle test chamber device of claim 1 wherein the electric vehicle fluid is a transmission fluid.

4. The electric vehicle test chamber device of claim 1 wherein the managing of the managing of the fluid data comprises evaluating oxidation to accounts for a factor selected from a group consisting of one of the types of electrical fields, test duration, temperature, pump implement speed and an air injection rate.

5. A test system for evaluating oxidation of an electric vehicle fluid, the system comprising: a test chamber accommodating the electric vehicle fluid; a pumping shaft implement with oxidation catalyst submerged within the fluid; a variable electrical input mechanism submerged within the fluid for application of multiple different types of electrical fields to the fluid, the fields facilitated by any of a direct current source, an alternating current source and an electromagnet; an acquisition unit for acquiring and managing fluid data in light of the applied conditions; wherein the variable electrical input mechanism comprises an insulated metallic wire; and the insulated metallic wire comprises a coil wrapped about the pumping shaft implement.

6. The test system of claim 5 further comprising at least one motor for supplying power to the pumping shaft implement and the variable electrical input mechanism.

7. The test system of claim 5 wherein the acquisition unit is a computer.

8. The test system of claim 5 wherein the evaluating of the oxidation accounts for a factor selected from a group consisting of one of the types of electrical fields, test duration, temperature, pumping shaft implement speed and an air injection rate.

9. The test system of claim 8 wherein the one of the types of electrical fields is facilitated by the direct current with voltage directed by the system.

10. The test system of claim 8 wherein the one of the types of electrical fields is facilitated by the alternating current with voltage, waveform and frequency directed by the system.

11. The test system of claim 8 wherein the one of the types of electrical fields is facilitated by the electromagnetic current with field strength directed by the system.

12. A method of evaluating oxidation of an electric vehicle fluid with a test system, the method comprising: filling a test chamber with an electric vehicle fluid for testing; actuating a pumping shaft implement submerged within the fluid; employing a variable electrical input mechanism submerged within the fluid to apply one of multiple different types of electrical fields to the fluid; and acquiring oxidation data from the electric vehicle fluid for analysis at an acquisition unit for managing fluid data in light of the one of the multiple different types of electrical fields; wherein the variable electrical input mechanism comprises an insulated metallic wire; and the insulated metallic wire comprises a coil wrapped about the pumping shaft implement.

13. The method of claim 12 wherein the analysis accounts for parameters selected from a group consisting of test duration, temperature, pumping shaft implement speed, air injection rate, the one of the types of electrical fields.

14. The method of claim 13 wherein the one of the types of electrical fields is a direct current field and the analysis further accounts for direct current voltage.

15. The method of claim 13 wherein the one of the types of electrical fields is an alternating current field and the analysis further accounts for alternating current voltage, waveform and frequency.

16. The method of claim 13 wherein the one of the types of electrical fields is a magnetic field and the analysis further accounts for field strength.

* * * * *